(12) United States Patent
Tseng et al.

(10) Patent No.: US 12,418,101 B2
(45) Date of Patent: Sep. 16, 2025

(54) WEARABLE DEVICE

(71) Applicant: Quanta Computer Inc., Taoyuan (TW)

(72) Inventors: Yi-Ling Tseng, Taoyuan (TW);
Chin-Lung Tsai, Taoyuan (TW);
Chung-Ting Hung, Taoyuan (TW);
Kai-Hsiang Chang, Taoyuan (TW);
Yu-Chen Zhao, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 98 days.

(21) Appl. No.: 18/398,346

(22) Filed: Dec. 28, 2023

(65) Prior Publication Data

US 2025/0125520 A1    Apr. 17, 2025

(30) Foreign Application Priority Data

Oct. 13, 2023   (TW) .................................. 112210998

(51) Int. Cl.
*H01Q 1/27* (2006.01)
*G02C 11/00* (2006.01)
*H01Q 9/04* (2006.01)

(52) U.S. Cl.
CPC ............. *H01Q 1/273* (2013.01); *G02C 11/10* (2013.01); *H01Q 9/0407* (2013.01)

(58) Field of Classification Search
CPC .... H01Q 1/243; H01Q 5/30–40; H01Q 1/273; G02C 11/10
See application file for complete search history.

(56) References Cited

U.S. PATENT DOCUMENTS

| 11,223,106 | B2 * | 1/2022 | Khripkov ................. H01Q 9/26 |
| 2023/0335922 | A1 * | 10/2023 | Wang ....................... H01Q 9/42 |
| 2025/0118887 | A1 * | 4/2025 | Ugwu ...................... H01Q 1/48 |

* cited by examiner

*Primary Examiner* — Hasan Islam
(74) *Attorney, Agent, or Firm* — McClure, Qualey & Rodack, LLP

(57) ABSTRACT

A wearable device includes a first radiation metal element, a second radiation metal element, a ground metal element, a third radiation metal element, and a carrier element. The first radiation metal element is coupled to a positive feeding point. The second radiation metal element is coupled to the positive feeding point. The ground metal element is coupled to a negative feeding point. The third radiation metal element is adjacent to the ground metal element. A coupling gap is formed between the third radiation metal element and the ground metal element. The first radiation metal element, the second radiation metal element, the ground metal element, and the third radiation metal element are disposed on the carrier element. An antenna structure is formed by the first radiation metal element, the second radiation metal element, the ground metal element, and the third radiation metal element.

10 Claims, 4 Drawing Sheets

WEARABLE DEVICE

CROSS REFERENCE TO RELATED APPLICATIONS

This application claims priority of Taiwan Patent Application No. 112210998 filed on Oct. 13, 2023, the entirety of which is incorporated by reference herein.

BACKGROUND OF THE INVENTION

Field of the Invention

The disclosure relates in general to a wearable device, and in particular, to a wearable device and an antenna structure therein.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Researchers predict that the next generation of mobile devices will be "wearable devices". For example, wireless communication may be applied to watches, glasses, and even clothes in the future. However, glasses, for example, do not have a large enough space to accommodate antennas for wireless communication. Therefore, this has become a critical challenge for antenna designers.

BRIEF SUMMARY OF THE INVENTION

In an exemplary embodiment, the invention is directed to a wearable device that includes a first radiation metal element, a second radiation metal element, a ground metal element, a third radiation metal element, and a carrier element. The first radiation metal element is coupled to a positive feeding point. The second radiation metal element is coupled to the positive feeding point. The ground metal element is coupled to a negative feeding point. The negative feeding point corresponds to the positive feeding point. The third radiation metal element is adjacent to the ground metal element. A coupling gap is formed between the third radiation metal element and the ground metal element. The first radiation metal element, the second radiation metal element, the ground metal element, and the third radiation metal element are all disposed on the carrier element. An antenna structure is formed by the first radiation metal element, the second radiation metal element, the ground metal element, and the third radiation metal element.

In some embodiments, the wearable device is a pair of smart eyeglasses with the function of wireless communication.

In some embodiments, the first radiation metal element and the second radiation metal element are implemented with a nose support element of the pair of smart eyeglasses.

In some embodiments, the carrier element is implemented with a nonconductive frame of the pair of smart eyeglasses.

In some embodiments, the combination of the first radiation metal element and the second radiation metal element substantially has an inverted U-shape. The third radiation metal element substantially has a variable-width straight-line shape.

In some embodiments, the antenna structure covers at least one operational frequency band. The operational frequency band is from 2400 MHz to 2500 MHz.

In some embodiments, the length of the first radiation metal element is substantially equal to 0.25 wavelength of the operational frequency band.

In some embodiments, the length of the second radiation metal element is substantially equal to 0.25 wavelength of the operational frequency band.

In some embodiments, the length of the third radiation metal element is substantially equal to 0.5 wavelength of the operational frequency band.

In some embodiments, the width of the coupling gap is from 2 mm to 5 mm.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
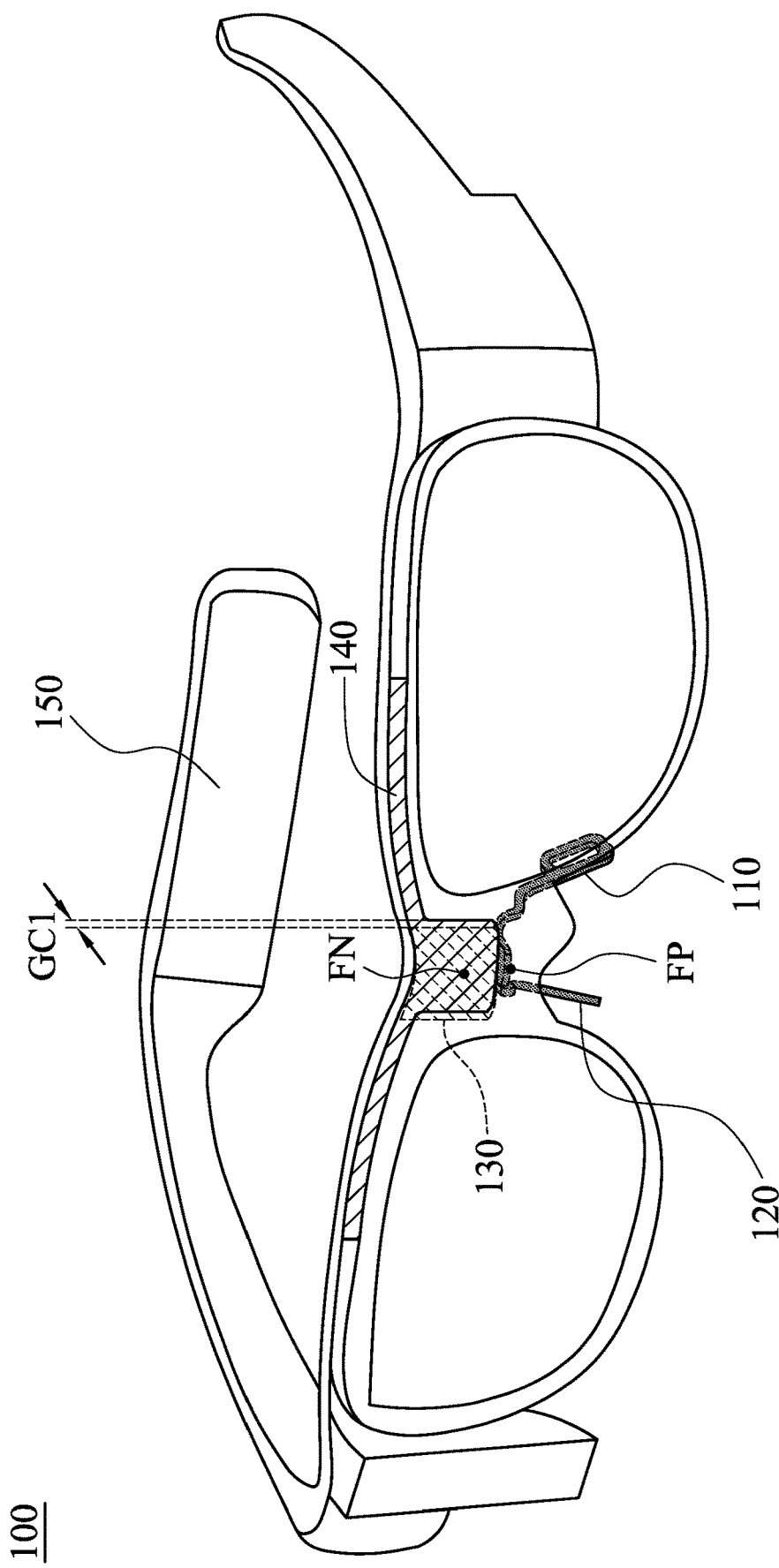
FIG. 1 is a perspective view of all elements of a wearable device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
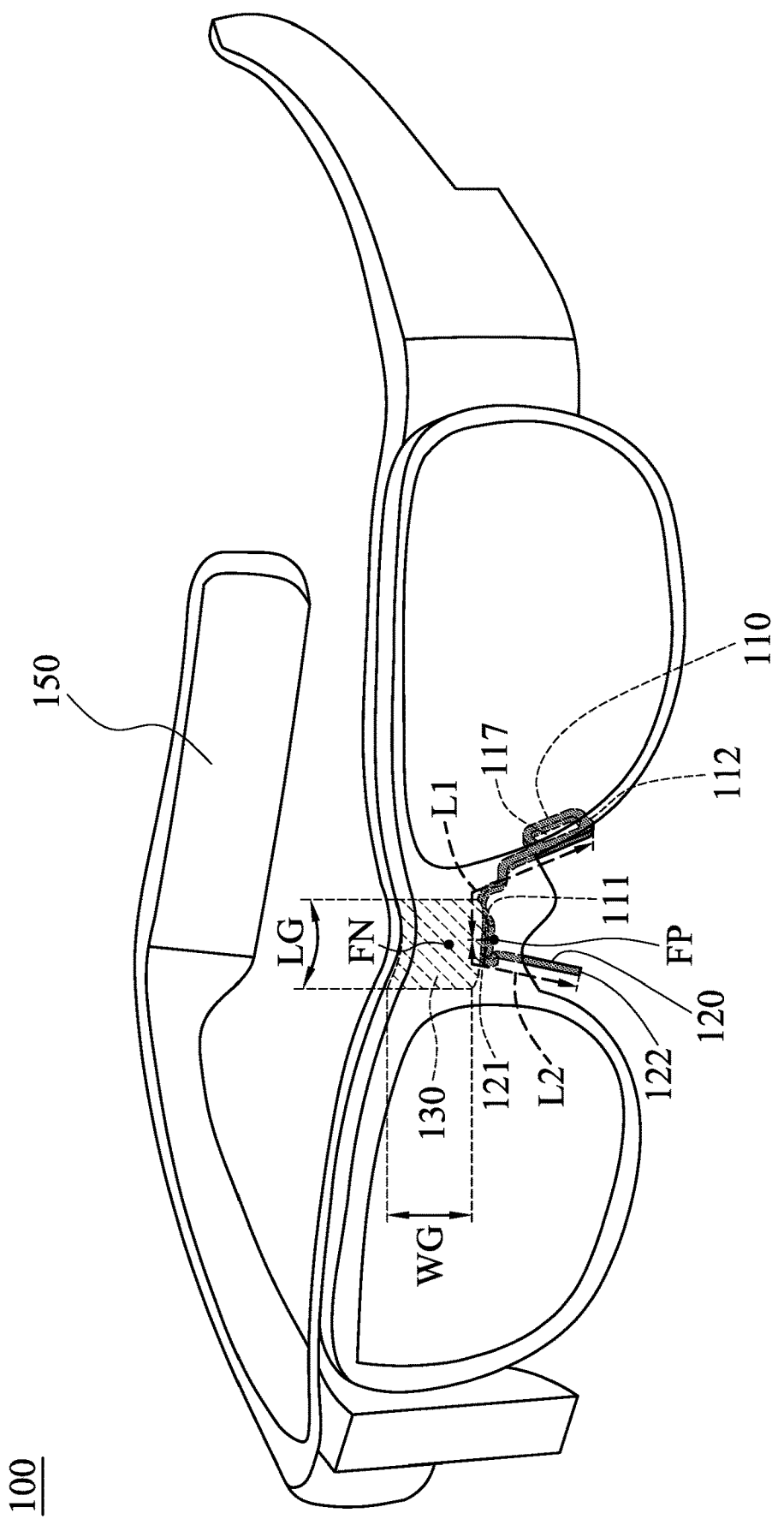
FIG. 2 is a perspective view of partial elements of a wearable device according to an embodiment of the invention.
Figure 3:
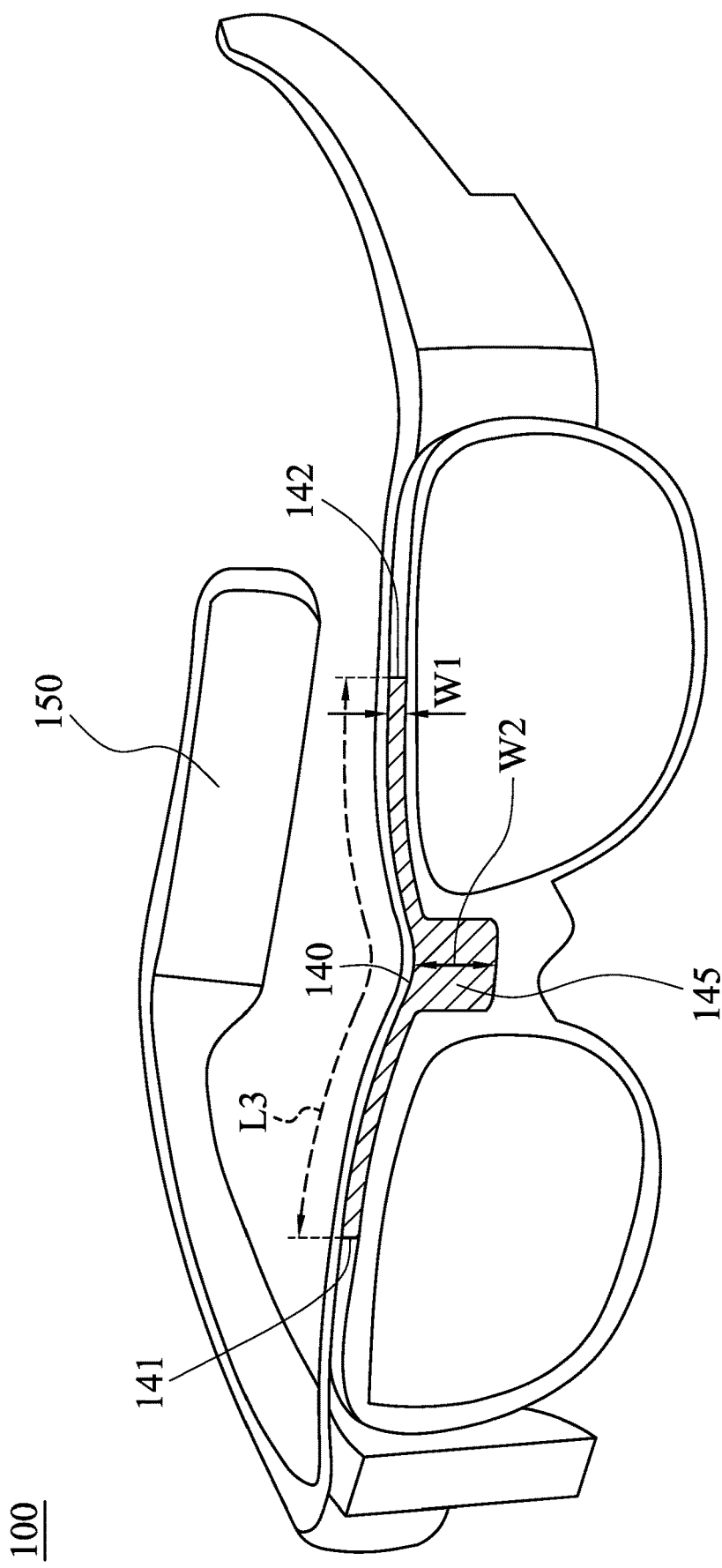
FIG. 3 is a perspective view of other partial elements of a wearable device according to an embodiment of the invention.

FIG. 1 is a perspective view of all elements of a wearable device 100 according to an embodiment of the invention. FIG. 2 is a perspective view of partial elements of the wearable device 100 according to an embodiment of the invention. FIG. 3 is a perspective view of the other partial elements of the wearable device 100 according to an embodiment of the invention. Please refer to FIG. 1, FIG. 2 and FIG. 3 together. It should be noted that some elements are omitted and not displayed in FIG. 2 and FIG. 3 such that readers can easily understand the invention. In the embodiment of FIG. 1, FIG. 2 and FIG. 3, the wearable device 100 is a pair of smart eyeglasses with the function of wireless communication, but it is not limited thereto.

Specifically, the wearable device 100 includes a first radiation metal element 110, a second radiation metal element 120, a ground metal element 130, a third radiation metal element 140, and a carrier element 150. For example, the first radiation metal element 110, the second radiation metal element 120, the ground metal element 130, and the third radiation metal element 140 may all be made of copper, silver, aluminum, iron, or their alloys. In addition, the carrier element 150 may be made of a nonconductive material, such as a plastic material. It should be understood that the wearable device 100 may further include other components, such as a processor, a speaker, a camera element, and/or a battery element, although they are not displayed in FIG. 1, FIG. 2 and FIG. 3.

For example, the combination of the first radiation metal element 110 and the second radiation metal element 120 may substantially have an inverted U-shape. Specifically, the first radiation metal element 110 has a first end 111 and a second end 112. The first end 111 of the first radiation metal element 110 is coupled to a positive feeding point FP. The second end 112 of the first radiation metal element 110 is an open end. In some embodiments, the first radiation metal element 110 further has an opening 117, which may be adjacent to the second end 112 of the first radiation metal element 110. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0).

Furthermore, the second radiation metal element 120 has a first end 121 and a second end 122. The first end 121 of the second radiation metal element 120 is also coupled to the positive feeding point FP. The second end 122 of the second radiation metal element 120 is an open end. In some embodiments, the second radiation metal element 120 further has another opening (not shown), which may be adjacent to the second end 122 of the second radiation metal element 120.

In some embodiments, the first radiation metal element 110 and the second radiation metal element 120 are implemented with a nose support element of the pair of smart eyeglasses. Each of the aforementioned openings (e.g., the opening 117) is configured to accommodate a nose support pad, but it is not limited thereto.

For example, the ground metal element 130 may substantially have a rectangular shape or a square shape. The ground metal element 130 may be adjacent to the first radiation metal element 110 and the second radiation metal element 120. The ground metal element 130 is coupled to a negative feeding point FN. The negative feeding point FN corresponds the positive feeding point FP. In some embodiments, the wearable device 100 further includes a signal source (not shown). Specifically, the signal source may be an RF (Radio Frequency) module. The positive electrode of the signal source may be coupled to the positive feeding point FP. The negative electrode of the signal source may be coupled to the negative feeding point FN.

For example, the third radiation metal element 140 may substantially have a variable-width straight-line shape. Specifically, the third radiation metal element 140 has a first end 141 and a second end 142, which may be two open ends substantially extending in opposite directions and away from each other. In some embodiments, the third radiation metal element 140 further includes a central widening portion 145. The third radiation metal element 140 is adjacent to the ground metal element 130. A coupling gap GC1 may be formed between the central widening portion 145 of the third radiation metal element 140 and the ground metal element 130. In some embodiments, the ground metal element 130 has a vertical projection on the third radiation metal element 140, and the vertical projection at least partially overlaps the central widening portion 145 of the third radiation metal element 140.

In some embodiments, the carrier element 150 is implemented with a nonconductive frame of the pair of smart eyeglasses. The shape and style of the carrier element 150 are not limited in the invention. The first radiation metal element 110, the second radiation metal element 120, the ground metal element 130, and the third radiation metal element 140 are all disposed on the carrier element 150. In alternative embodiments, the carrier element 150 further includes an external frame element (not shown), and the third radiation metal element 140 is formed on the external frame element using the LDS (Laser Direct Structuring) technology.

In a preferred embodiment, an antenna structure of the wearable device 100 is formed by the first radiation metal element 110, the second radiation metal element 120, the ground metal element 130, and the third radiation metal element 140. Therefore, the wearable device 100 can provide wireless communication.

Figure 4:
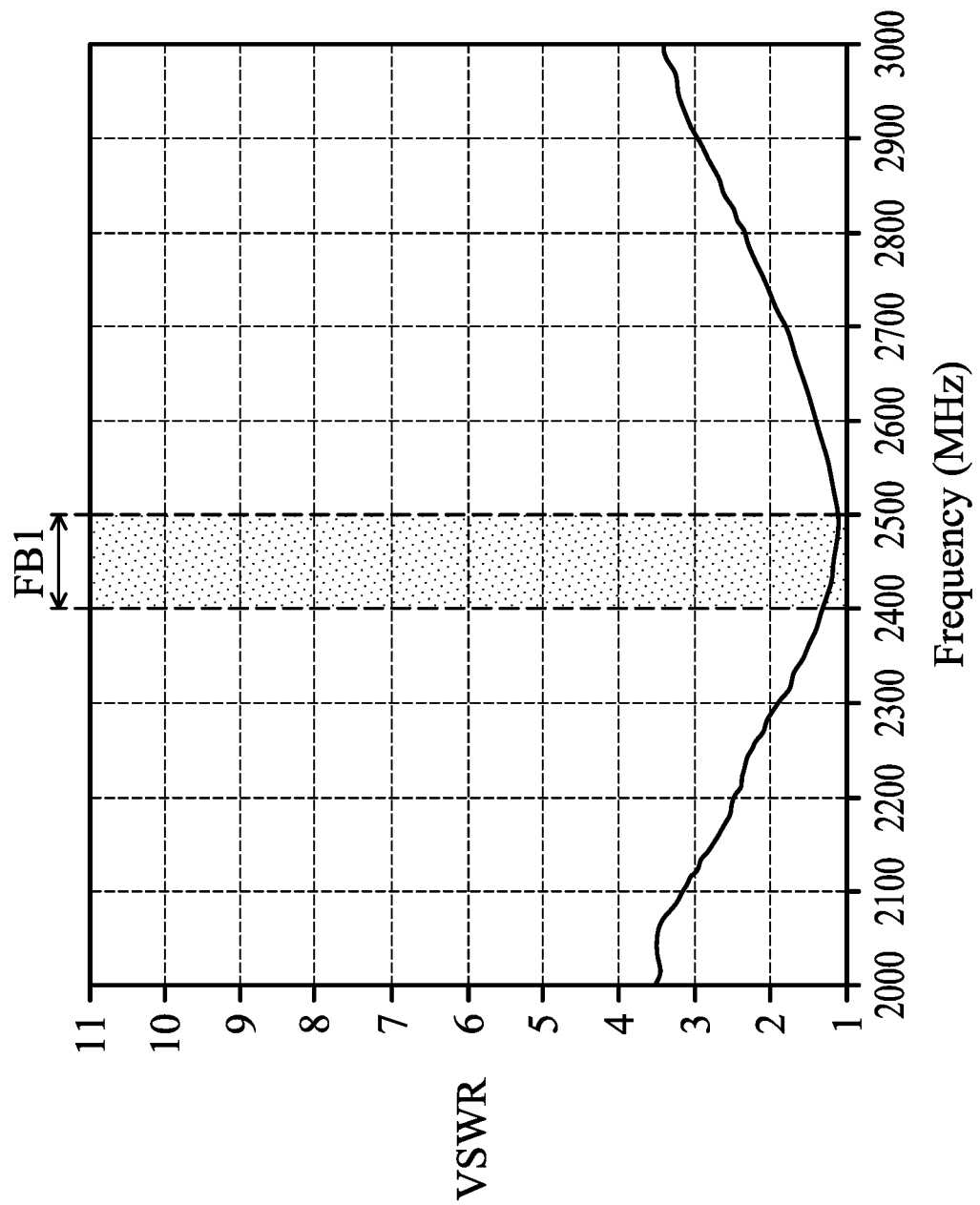
FIG. 4 is a diagram of VSWR (Voltage Standing Wave Ratio) of an antenna structure of a wearable device according to an embodiment of the invention.

FIG. 4 is a diagram of VSWR (Voltage Standing Wave Ratio) of the antenna structure of the wearable device 100 according to an embodiment of the invention. The horizontal axis represents the operational frequency (MHz), and the vertical axis represents the VSWR. According to the measurement of FIG. 4, the antenna structure of the wearable device 100 can cover at least one operational frequency band FB1. For example, the operational frequency band FB1 may be from 2400 MHz to 2500 MHz. Therefore, the wearable device 100 can support at least the wideband operation of WLAN (Wireless Local Area Networks) 2.4 GHz. However, the invention is not limited thereto. In alternative embodiments, the operational frequency band FB1 further includes a frequency interval from 5150 MHz to 5850 MHz, and another frequency interval from 5925 MHz to 7125 MHz, such that the wearable device 100 can also support the wideband operation of Wi-Fi 6E.

In some embodiments, the operational principles of the antenna structure of the wearable device 100 will be described as follows. The first radiation metal element 110 and the second radiation metal element 120 can be excited to generate the operational frequency band FB1. Also, the third radiation metal element 140 can be excited by the ground metal element 130 using a coupling mechanism. According to the practical measurement, the incorporation of the third radiation metal element 140 can help to fine-tune the impedance matching of the antenna structure of the wearable device 100, thereby significantly increasing the operational bandwidth thereof. It should be noted that the overall size of the wearable device 100 of the invention can be further reduced since the proposed antenna structure is well integrated with the wearable device 100.

In some embodiments, the element sizes of the wearable device 100 will be described as follows. The length L1 of the first radiation metal element 110 may be substantially equal to 0.25 wavelength (λ/4) of the operational frequency band FB1 of the antenna structure of the wearable device 100. The length L2 of the second radiation metal element 120 may be substantially equal to 0.25 wavelength (λ/4) of the operational frequency band FB1 of the antenna structure of the wearable device 100. The length LG of the ground metal element 130 may be from 11 mm to 15 mm, such as about 13 mm. The width WG of the ground metal element 130 may be from 8 mm to 12 mm, such as about 10 mm. The length L3 of the third radiation metal element 140 may be substantially equal to 0.5 wavelength (λ/2) of the operational frequency band FB1 of the antenna structure of the wearable device 100. In the third radiation metal element 140, the width W2 of its central widening portion 145 may be at least three times the width W1 of its other portions (i.e., W2≥3·W1). The width of the coupling gap GC1 may be from 2 mm to 5 mm. The above ranges of element sizes are calculated and obtained according to many experiment results, and they help to optimize the operational bandwidth and the impedance matching of the antenna structure of the wearable device 100.

The invention proposes a novel wearable device. In comparison to the conventional design, the invention has at least the advantages of: (1) covering the wideband operations, (2) integrating the antenna structure, (3) minimizing the whole antenna size, and (4) reducing the whole manufacturing cost. Therefore, the invention is suitable for application in a variety of small-size wearable devices with communication functions.

Note that the above element sizes, element shapes, and frequency ranges are not limitations of the invention. An antenna designer can fine-tune these settings or values according to different requirements. It should be understood that the wearable device of the invention is not limited to the configurations of FIGS. 1-4. The invention may merely include any one or more features of any one or more embodiments of FIGS. 1-4. In other words, not all of the features displayed in the figures should be implemented in the wearable device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wearable device, comprising:
   a first radiation metal element, coupled to a positive feeding point;
   a second radiation metal element, coupled to the positive feeding point;
   a ground metal element, coupled to a negative feeding point, wherein the negative feeding point corresponds to the positive feeding point, such that a positive electrode of a signal source is coupled to the positive feeding point and a negative electrode of the signal source is coupled to the negative feeding point;
   a third radiation metal element, disposed adjacent to the ground metal element, wherein a coupling gap is formed between the third radiation metal element and the ground metal element; and
   a carrier element, wherein the first radiation metal element, the second radiation metal element, the ground metal element, and the third radiation metal element are disposed on the carrier element;
   wherein an antenna structure is formed by the first radiation metal element, the second radiation metal element, the ground metal element, and the third radiation metal element, and
   wherein the wearable device is a pair of smart eyeglasses.

2. The wearable device as claimed in claim 1, wherein the wearable device has a function of wireless communication.

3. The wearable device as claimed in claim 2, wherein the first radiation metal element and the second radiation metal element are implemented with a nose support element of the pair of smart eyeglasses.

4. The wearable device as claimed in claim 2, wherein the carrier element is implemented with a nonconductive frame of the pair of smart eyeglasses.

5. The wearable device as claimed in claim 1, wherein a combination of the first radiation metal element and the second radiation metal element substantially has an inverted U-shape, and the third radiation metal element substantially has a variable-width straight-line shape.

6. The wearable device as claimed in claim 1, wherein the antenna structure covers at least one operational frequency band, and the operational frequency band is from 2400 MHz to 2500 MHz.

7. The wearable device as claimed in claim 6, wherein a length of the first radiation metal element is substantially equal to 0.25 wavelength of the operational frequency band.

8. The wearable device as claimed in claim 6, wherein a length of the second radiation metal element is substantially equal to 0.25 wavelength of the operational frequency band.

9. The wearable device as claimed in claim 6, wherein a length of the third radiation metal element is substantially equal to 0.5 wavelength of the operational frequency band.

10. The wearable device as claimed in claim 1, wherein a width of the coupling gap is from 2 mm to 5 mm.

* * * * *